Fig. 1

Inventor
Frank W. Spencer
By his Attorney
Robert E. Ross

United States Patent Office 2,985,882
Patented May 30, 1961

2,985,882

FASTENER INSERTING MACHINES

Frank W. Spencer, Beverly, Mass., assignor to United Shoe Machinery Corporation, Flemington, N.J., a corporation of New Jersey Filed Jan. 26, 1960, Ser. No. 4,660

10 Claims. (Cl. 1—19)

This invention relates to fastener inserting machines, and has particular reference to a machine which is adapted to position a work piece into a fastener receiving position automatically according to its size, and to insert a series of fasteners into the work piece in a predetermined pattern.

The invention is illustrated herein as being applied to a machine arranged to insert fasteners into shoes, particularly fiber fasteners such as are often used in attaching the outsole to the heel seat. When used for this purpose the fasteners are inserted in a pattern extending along both sides and around the back of the heel seat, and are spaced inwardly from the periphery of the heel a predetermined distance. The width of the fastener pattern, the radius of curvature of the pattern at the back of the heel, and also the distance the fasteners extend forwardly along the sides of the heel seat, is a function of the size of the shoe.

Heretofore the marginal distance between the fasteners and the outer edge of the heel seat has been determined by a gage against which the operator holds the side of the heel while the fasteners are being inserted. The gage must be adjusted for each size of shoe, which procedure is inconvenient and subject to operator error. The starting and finishing point of the pattern must also be determined for each individual shoe by the operator, frequently resulting in a lack of uniformity in the fastener pattern in different sizes of shoes.

The object of the present invention is to provide a fastener inserting machine in which means is provided for positioning a work piece into a predetermined relationship to a fastener driving mechanism automatically according to the size of the work piece.

A further object of the invention is to provide a work piece positioning mechanism for the above purpose which has means responsive to the size of the work piece to control the pattern of fasteners inserted therein.

A further object of the invention is to provide a support to receive a last carrying a partially fabricated shoe which is adapted to guide the shoe through a predetermined path in response to lateral feeding imparted thereto by a fastener inserting mechanism.

A further object of the invention is to provide a machine for performing an operation on a lasted shoe in which novel means is provided for moving the lasted shoe into an operative position.

The illustrated embodiment of the present invention is shown as applied to a fastener inserting machie of the general type show in United States Letters Patent No. 1,030,775, granted June 25, 1912 upon an application of G. Goddu, with modifications shown in United States Letters Patent No. 1,849,253, granted March 15, 1932 upon an application of F. N. La Chapelle, to adapt the machine for driving fiber pegs. The work support of the machine incorporates, with certain modifications to appear hereinafter, a mechanism of the type shown in United States Letters Patent No. 1,587,848, granted June 8, 1926, upon an application of F. L. MacKenzie. These patents, and United States Letters Patent No. 1,011,941, granted December 19, 1911, upon an application of G. Goddu showing the treadle mechanism, should be referred to for a detailed description of such parts of the machine as are unnecessary to illustrate herein.

Figure 1:
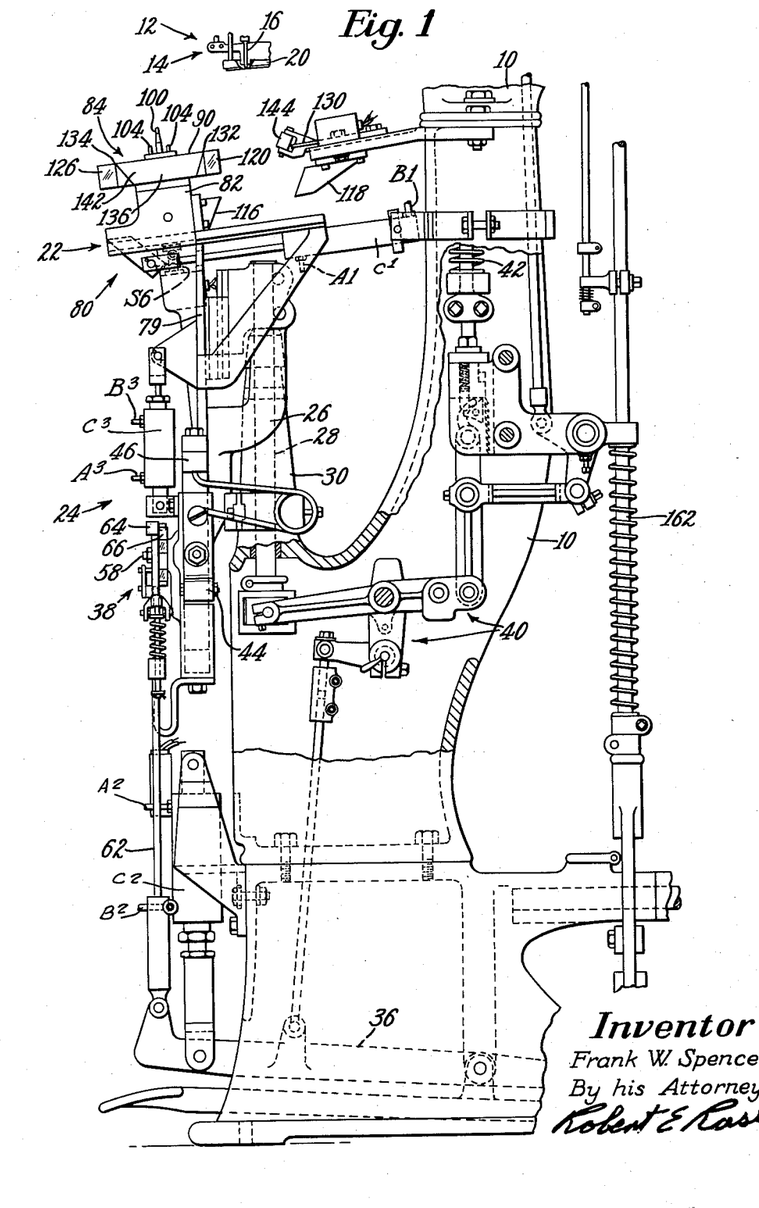
Fig. 1 is a view in side elevation of a fastener inserting embodying the features of the invention, with the mechanisms being disposed in the inoperative position.
Figure 2:
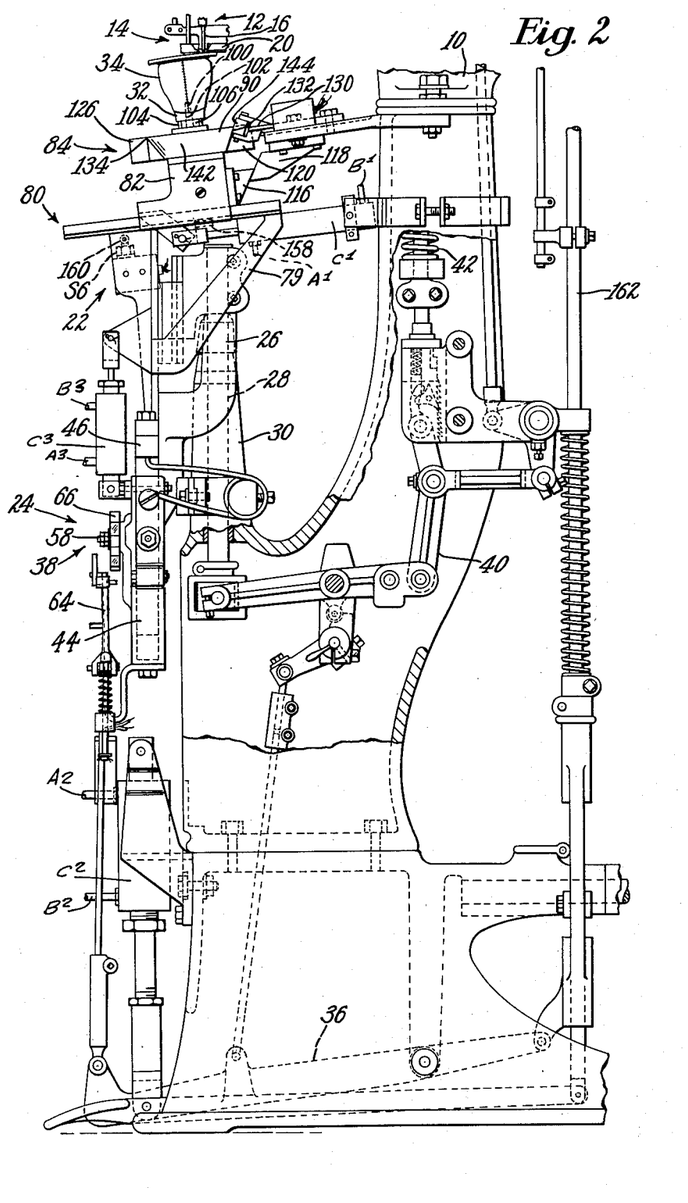
Fig. 2 is a view in side elevation of the machine of Fig. 1 with the mechanism being disposed in the operative position.

The machine is provided with a column 10 which supports at its upper end a head 12 provided with a fastening inserting mechanism, indicated generally in Figs. 1 and 2 by the numeral 14, and including an awl 16 and a driver (not shown) arranged to punch a hole in the work being operated upon, to feed the work laterally (to the left in Figs. 12 and 13) so that the punched hole is in alinement with the driver, and to drive a fastener into the hole. In the illustrated embodiment the fastener may be composed of a continuous length of fibrous material, such as paper, twisted to form, when cut to the proper length, a stiff peg 18, and may be fed to the machine from a roll (not shown). The awl and fastener driver are cam operated, as disclosed in United States Letters Patent No. 1,686,808, granted October 9, 1928, upon an application filed in the name of G. Goddu and F. L. MacKenzie, and the pegs are cut and delivered to a throat movable into line with the driver in the manner disclosed in the La Chapelle Patent 1,849,253. The head of the machine is also provided with an awl plate or abutment 20 against which the work is clamped during the fastener inserting operation.

The machine is provided with a work support mechanism 22 and a jacking mechanism, indicated generally at 24, which are mounted on a supporting arm 26 so as to be vertically slidable thereon. The arm 26 is secured to the upper end of a rod 28 which is disposed for vertical movement within an upstanding frame post 30.

The work support mechanism 22 is adapted to carry a last 32 having a partially fabricated shoe 34 disposed thereon, and is arranged to be moved upwardly by the jacking mechanism 24, when the mechanism is actuated by downward movement of treadle 36, in a manner to appear hereinafter. The work support mechanism is locked in this upper position, with the heel seat of the shoe bearing against the abutment 20, by jack locking mechanism illustrated generally by numeral 38, which is fully disclosed in the MacKenzie Patent 1,587,848. Downward movement of the treadle 36 also actuates another mechanism, indicated generally by numeral 40, within the column 10 which acts through a spring 42 and resiliently urges the rod 28 upwardly during the downward stroke of the fastener driving mechanism. The upward force so applied to the rod 28 acts through the locked jack mechanism to clamp the shoe against the abutment during the hole punching and fastener driving portions of the machine cycle. As is fully disclosed in the Goddu et al. Patent 1,686,808, referred to above, the mechanism 40 operates automatically during the machine cycle to release the pressure on the rod 28 after the punching and driving stroke to enable the awl to feed the work laterally into position for the next punching and driving stroke, after which it again applies the upward force to the rod 28.

Figure 3:
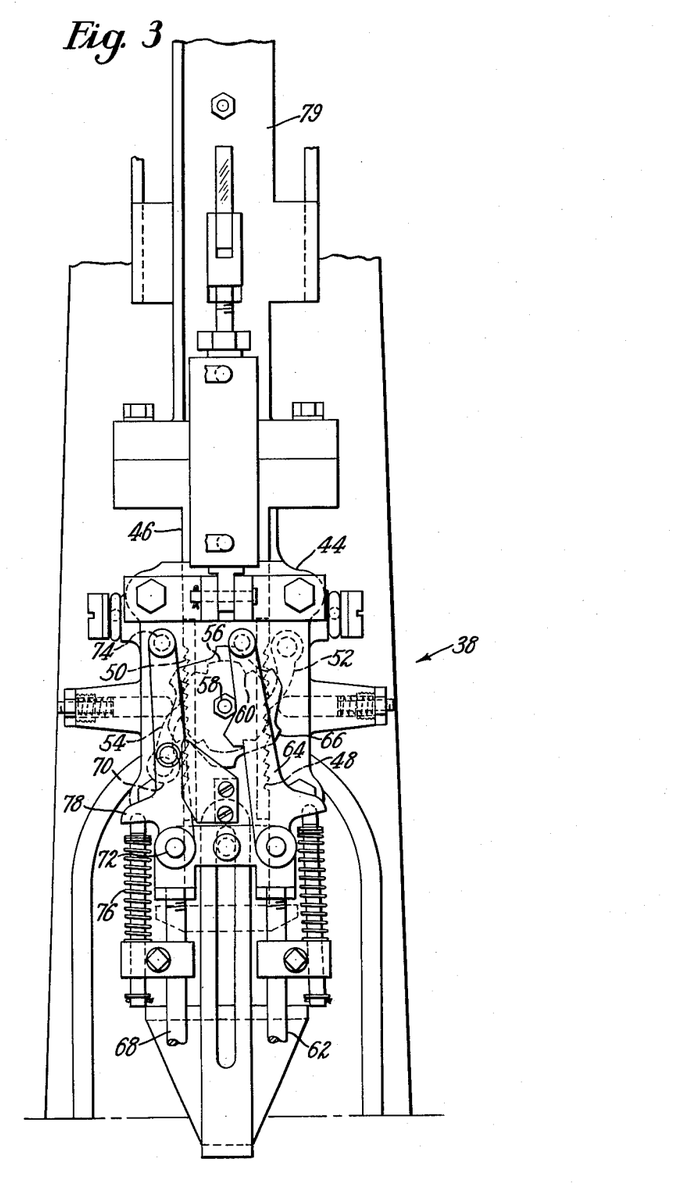
Fig. 3 is an enlarged view of the jack and jack locking mechanism of the machine, as seen from the left side of Fig. 1, with the jack mechanism in the down and locked position.

The jack mechanism 38 comprises a slide housing 44 disposed on the lower end of the supporting arm 26 and a slide 46 carried in the housing and adapted for vertical movement therein, said movement being controlled by the ratchet and pawl mechanism illustrated in the MacKenzie Patent 1,587,848 with certain modifications now to be described (see Fig. 3).

As shown in the MacKenzie patent, the slide 46 is provide with a pair of ratchet bars 48 and 50 which have oppositely directed teeth normally engaged by pawls 52 and 54 disposed in the slide housing 44 so that the slide is normally locked against movement in either direction.

To release the pawls, to permit movement of the slide in the slide housing, a pawl release cam plate 56 is provided between the pawls mounted on cam shaft 58. The plate 56 is provided with suitably shaped notches 60 for engagement with portions of the pawls 52 and 54 so that rotation of the plate 56 through a small angle releases the pawls to permit movement of the slide, and further rotation again permits engagement of the pawls with the ratchet bars to lock the slide. Rotation of the pawl release cam plate 56 for this purpose is effected by downward movement of the treadle 36 which, in pulling rod 62 downwardly, causes link 64 to pull a ratchet cam plate 66, also mounted on cam shaft 58 through the desired angle.

In the normal operation of the device, at the start of the downward movement of the treadle, pawls 52 and 54 are unlocked momentarily to permit the slide 46 to move upwardly by means to appear hereinafter, so that the shoe 34 is forced against the awl plate abutment 20. Further downward movement of the treadle relocks the slide in the slide housing so that upward forces applied by the machine mechanism through rod 28 are transferred through the jack locking mechanism 38 to the work support mechanism.

In the present embodiment of the machine, means is also provided for unlocking the jack locking mechanism 38 by upward movement of the treadle. For this purpose a second rod 68 extends upwardly from the treadle and carries a link 70 pivoted at axis 72 with a pawl stud 74 disposed on the upper end. The link 70 is biased toward the ratchet cam plate 66 by a spring 76 bearing against a lateral finger 78.

The link 70 is so arranged that on downward movement of the treadle 36 the pawl stud 74 passes by the ratchet cam, without interfering with the clockwise motion imparted thereto by the link 64 on the opposite side.

However, on upward movement of the treadle, the pawl stud engages the ratchet cam plate 66, again causing clockwise rotation of the ratchet cam plate, momentarily unlocking the slide and permitting downward movement of the slide and shoe support mechanism in a manner to appear hereinafter.

The work support mechanism 22 comprises a bracket 79 disposed on the upper end of the slide 46 with a shoe positioning mechanism 80 disposed thereon and slidable on the bracket into and out of a position beneath the fastener inserting mechanism.

Figure 6:
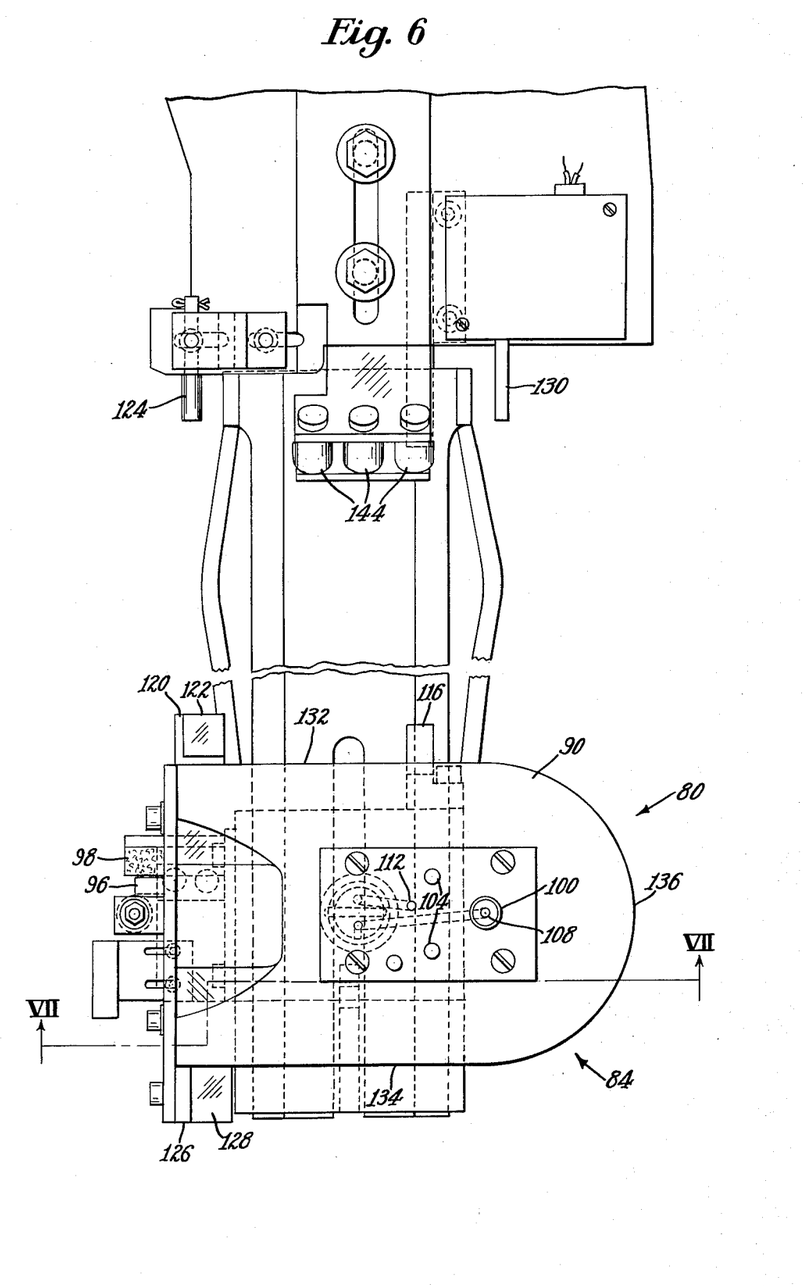
Fig. 6 is a top plan view of the shoe positioning mechanism in the position as shown in Fig. 1.
Figure 7:
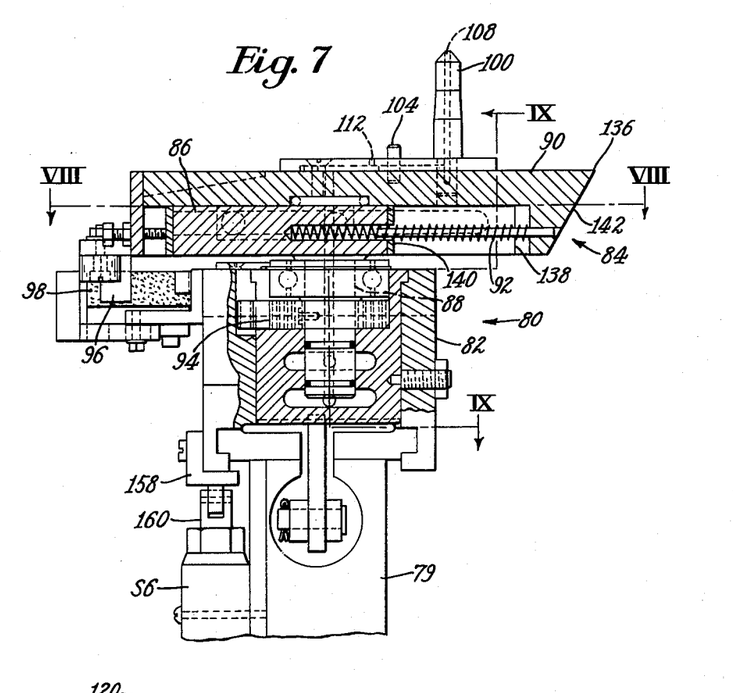
Fig. 7 is a view in section taken on line VII—VII of Fig. 6.
Figure 8:
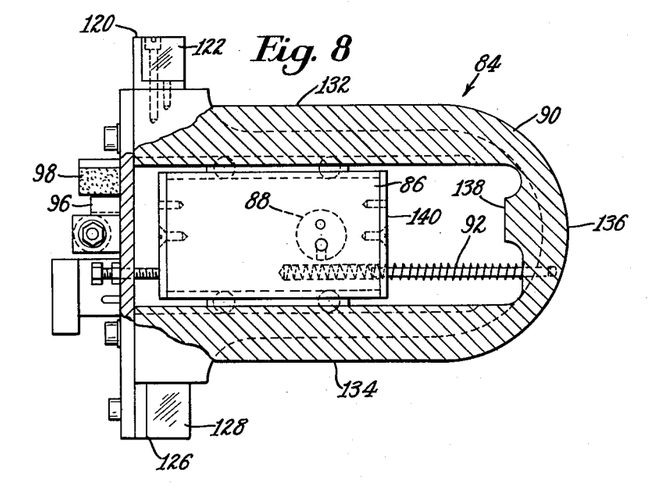
Fig. 8 is a view in section taken on line VIII—VIII of Fig. 7.

The shoe positioning mechanism 80 comprises a support block 82 and a last carrier 84 disposed therein so as to be both rotatable and movable laterally in a predetermined direction in relation to the support block. To this end, the last carrier comprises an inner portion 86 having a downwardly projecting shaft 88 disposed within a suitable opening in the support block so as to be rotatable therein, and an outer cam plate 90 which is slidable laterally (to the left in Figs. 7 and 8) on the inner portion a predetermined distance against the force of a spring 92. To bias the last carrier into a predetermined orientation in relation to the machine, a coil spring 94 is provided in the support block, which is secured at one end to the block and at the other end to the shaft 88, so that the last carrier is continually urged in a clockwise direction. Stop means 96 is provided in the cam plate to cooperate with an abutment 98 on the support block 82 so that the cam plate is normally held in the orientation shown in Figs. 6 and 12.

The cam plate 90 is provided with an upstanding thimble post 100 to be received in the thimble hole 102 of the last, and a pair of positioning studs 104 are spaced from the post 100 for cooperating with a positioning plate 106 on the top of the last to orient the last on the cam plate and to cause the last to rotate with the cam plate.

Figure 9:
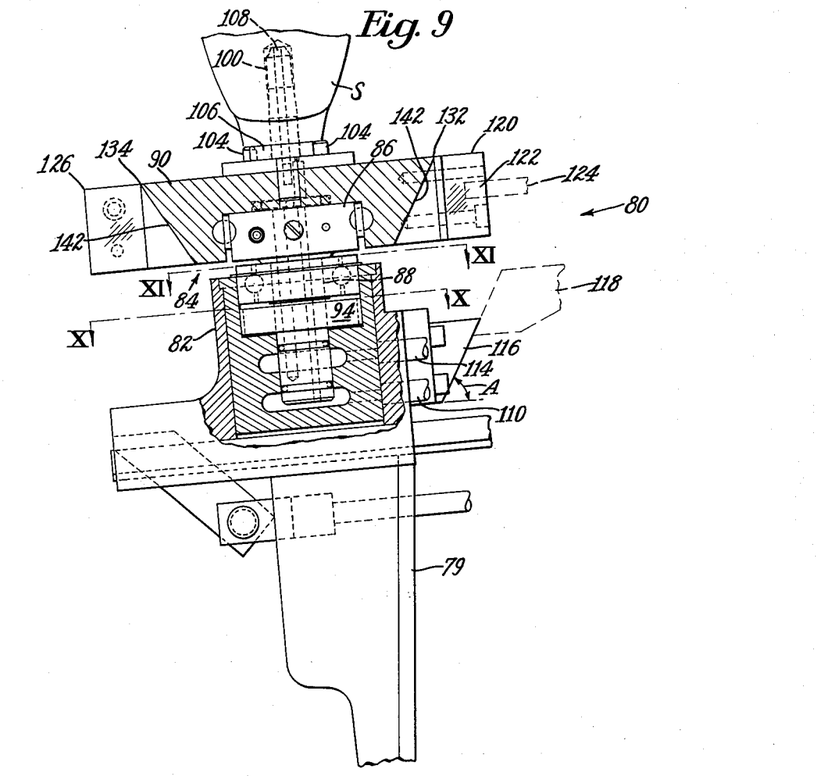
Fig. 9 is a view in section taken on line IX—IX of Fig. 7 with a last carrying a partially fabricated shoe disposed therein.
Figure 10:
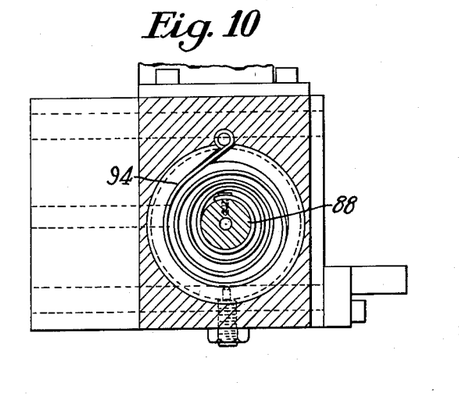
Fig. 10 is a view in section taken on line X—X of Fig. 9.
Figure 11:
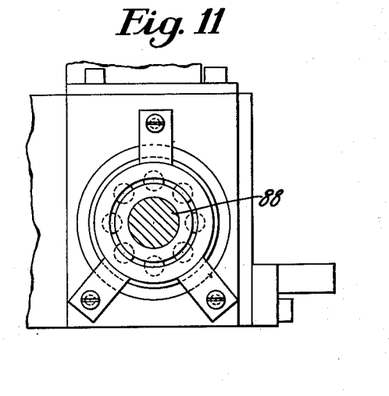
Fig. 11 is a view in section taken on line XI—XI of Fig. 9.

In the illustrated embodiment the thimble post 100 is provided with a central aperture 108 which connects, through suitable internal passages in the shaft 88 and the block 82, to an external pneumatic connection 110 (Fig. 9). Another aperture 112 (Fig. 7) is provided in the cam plate, in position to be closed by the last positioning plate 106 when the last is assembled onto the thimble, and connects, through suitable internal apertures, to an external pneumatic connection 114, for a purpose to appear hereinafter.

One of the principal features of the present machine is its ability to vary the pattern of the fasteners automatically according to the size of the shoe being made. For example, the larger the shoe the greater the length of the line of fasteners along the sides of the heel, and the greater the radius of curvature of the line of fasteners around the back of the heel. The positioning mechanism, in a manner to be described, automatically positions the shoe so that the fastener inserting operation starts at the proper point on one side of the heel seat, controls the radius of curvature of the line of fasteners around the back of the heel, and stops the fastener inserting operation at the proper point on the other side of the heel seat.

To position the shoe accurately for the above purpose, it is desirable to utilize lasts in which the heel height in the various sizes is proportional to the dimensions of the heel seat, and in which the thimble hole 13 is perpendicular to the plane of the heel seat and located at the center of curvature of the back of the heel seat.

Lasts meeting these requirements include the so-called geometrically graded lasts, as disclosed in United States Letters Patent No. 1,948,547, issued February 27, 1934, upon an application of Laurence E. Topham.

With the heel height of the last proportional to the heel dimensions, ratios between these dimensions can be established so that the heel width or length of a shoe of any size can be determined from the last height of that size. These ratios may be used by the machine to position and control the movement of the shoe, as will now be described.

To enable the machine to position the shoe laterally (that is, in a direction perpendicular to the heel seat center line), to establish a proper margin distance between the fasteners and the edge of the heel, a lateral positioning cam 116 is provided on the support block 82 which projects forwardly therefrom for bearing against a cooperating cam abutment 118 disposed on the machine.

The mating faces of the positioning cam 116 and the abutment 118 are cut at an angle A to the direction of movement of the support block 82 (see Fig. 9). Hence, when the shoe positioning mechanism is forced inwardly along the bracket 79 and upwardly by the jack mechanism 24 so that the heel seat of the shoe is forced against the awl plate 20, the ultimate position of the shoe in an inward direction is determined by how high the positioning cam can rise on the cam abutment which, in turn, is determined by the heel height of the last.

Considering two lasts of different sizes, the smaller size, having a lesser heel height, will move upwardly further than the larger size, hence the cam 116 can move inwardly further on the abutment 118.

Since the radius of the heel seat feather line, as measured from the axis of the thimble hole, of any size last is proportional to the heel height of that size, it is desirable that the inward movement of the support block be related to the upward movement thereof in the same manner that the radius of the heel seat, minus the margin distance, is related to the heel height.

Hence the angle A of the cam 116 and cam abutment 118 is determined by taking as its tangent the height of the last divided by the radius of the fastener pattern at the back of the heel.

For example, an 8D last of a geometrically graded tariff has a heel height of 2.444 inches, and a heel and radius of 1.178 inches, as measured from the center line of the thimble axis to the heel seat feather line. Allowing a margin of .125 inch between the line of fasteners and the fastener line, the radius of the fastener pattern becomes 1.053. Hence, the tangent of angle A is 2.444 divided by 1.053, or 2.32 and angle A is approximately 67°.

To position the cam plate 90 in a direction longitudinally of the shoe according to the size thereof, a projecting boss 120 is provided on the side of the cam plate normally facing the machine with a cam face 122 inclined downwardly toward the heel end of the cam plate at an angle B to the plane of lateral movement thereof. A projecting stud 124 is provided in the frame of the machine positioned to be engaged by the cam face 122 when the lasted shoe is forced upwardly against the awl plate, so that the cam plate is forced laterally. Assuming that the line of fasteners on the side of the heel seat is to extend forwardly to the breast line, the desired lateral movement of the cam plate is related to the upward movement thereof in the same manner that the distance from the breast line to the thimble axis is related to the heel height.

Hence the angle B may be found by taking as its tangent the heel height divided by the distance from the thimble axis to the breast line.

In the case of the 8D last previously mentioned, the distance from the breast line to the thimble axis is 1.518 inches, the heel height is 2.444 inches, hence the tangent of angle B is 2.444 inches divided by 1.518 or 1.61. Hence, angle B is approximately 58°.

A corresponding boss 126 is provided on the other side of the cam plate having a cam face 128 which is parallel to the cam face 122 and disposed substantially the same distance longitudinally of the plate from the thimble. The cam face 128 is intended for cooperation with a projecting switch lever 130 extending from a switch S4 to terminate the fastener inserting operation at the proper point, as will be described hereinafter.

The cam plate 90 has a peripheral shape corresponding to that of the fastener pattern desired, that is, with two parallel side edges 132, 134 joined by a semicircular heel end 136. As previously mentioned, the cam plate 90 is capable of transverse movement on the support block (to the left in Figs. 7, 8, 12 and 14) under the impetus of the fastener inserting mechanism. The extent of this movement is limited by a stop 138 on the under side of the cam plate and an abutment 140 on the support which are so positioned that when the stop 138 is in contact with the abutment 140 the center of the semicircular portion 136 coincides with the axis of rotation of the cam plate about the shaft 88.

The periphery of the cam plate is cut at an angle to the thimble axis which is the same as the angle of the positioning cam 116 to provide a cam face 142 which extends along both sides 132 and 134 and around the semicircular portion 136.

To cooperate with the cam face 142 in guiding the cam plate through the desired movement, a series of rollers 144 are mounted in the machine frame, with the roller axes disposed at the same angle to the cam plate as is the cam face 142.

To prevent damage to the rollers by the cam plate when the shoe positioning mechanism is moved to the "in" position, the rollers are so positioned that when the positioning cam 116 strikes the cam abutment 118 the cam plate is spaced from the rollers a small distance, such as about .005 to .008 inch. This distance is sufficient to protect the rollers from damage by being struck by the cam plate yet does not impair the accuracy of the fastener pattern controlled by the cam plate as will now be described.

Figures 12, 13, 14, 15:
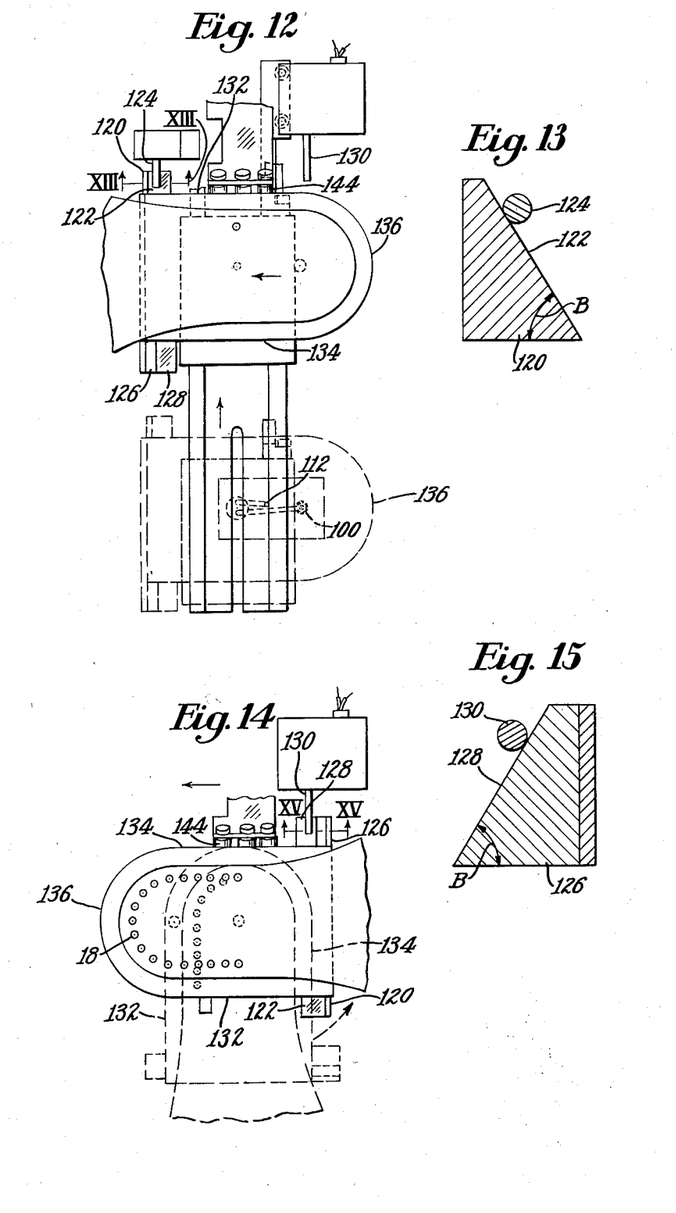
Fig. 12 is a top plan view of the shoe positioning mechanism and last carrier in the operative position as seen in Fig. 2, with certain parts of the machine omitted for clarity, and with the inoperative position of the last carrier, as seen in Fig. 1, shown in phantom line.
Fig. 13 is a section on line XIII—XIII of Fig. 12.
Fig. 14 is a top plan view of the mechanism of Fig. 12 illustrating, in phantom line, an intermediate position of the cam plate on which the last is mounted, and in full line, the final position of the cam plate.
Fig. 15 is a section o line XV—XV of Fig. 14.

As mentioned previously, the fastener inserting operation involves a step-by-step feeding of the work from right to left, as seen in Figs. 12 and 14. Since the point at which the lateral feeding force is applied is spaced from the axis of rotation of the last carrier 84, a turning moment about the axis is created, tending to rotate the last carrier. However, the shoe positioning mechanism, during the fastener inserting operation, is held firmly against the cam abutment, with the side of the cam plate substantially disposed against the rollers 144, thereby preventing rotation of the last carrier during this portion of the fastener inserting operation. Hence, the feeding movement during this portion of the fastener inserting operation results only in lateral movement of the cam plate on the inner portion 86 of the last carrier, compressing spring 92, so that the fasteners are inserted in a straight line along the left or innermost side of the heel seat. Movement of the cam plate in this manner continues until stop 138 on the under side of the cam plate contacts abutment 140 on the inner portion 80 at which point the thimble axis, which is the center of curvature of the heel end 136, coincides with the axis of the shaft 88 supporting the last carrier. Thereafter, continued feeding by the fastener inserting mechanism causes the cam plate to rotate about the thimble axis so that fasteners are inserted around the heel end of the shoe, with the radius of curvature of the line of fasteners being determined by the position of cam face 142 in relation to the rollers (see Fig. 14).

When the fastener inserting operation reaches the other side of the heel, the side 134 of the cam plate bears against the rollers preventing further rotation. Thereafter, continuous feeding causes the cam plate again to move laterally on the support block to the left so that fasteners are inserted in a straight line along the right side of the heel.

The fastener inserting operation is terminated when cam face 128 contacts resilient switch lever 130, closing switch S4, which, in a manner to be described hereinafter, causes the jacking pressure to be released and also moves the shoe positioning mechanism to the "out" position. During the portion of the fastener inserting operation in which the last carrier is rotated, the coil spring 94 is tightened, so that when the jacking pressure is released, the last carrier rotates in the reverse direction (clockwise) to return to the starting position.

In the illustrated embodiment of the invention, the movement of the shoe positioning mechanism into and out of the operative position under the fastener inserting mechanism, the jacking mechanism, and the treadle mechanism are controlled by pneumatic means, so that the entire operation is automatic after the operator has placed a last one the thimble post.

The movement of the support block 82 along the bracket 79 is accomplished by a transfer piston P-1 disposed in a cylinder C-1 which is attached to the machine frame, so that pressure applied to one side of the piston through connection A-1 causes the shoe support mechanism to move to the "in" position, whereas pressure applied to the opposite side of the piston through connection B-1 causes the shoe support mechanism to move to the "out" position.

Movement of the shoe support mechanism in the upward direction is accomplished by jacking piston P-3 disposed in cylinder C-3 attached to the jack slide housing 44, with the piston being attached to the bracket 78. Pressure applied to the lower side of the piston through connection A-3 moves the work support mechanism 22 upwardly to the operative position, whereas pressure applied to the upper side of the piston through connection B-3 moves the work support downwardly out of the operative position.

The downward and upward movement of the treadle to operate the jack mechanism and to start and stop the operation of the fastener inserting mechanism is accomplished by treadling piston P-2 in cylinder C-2. Pressure applied to the upper side of the piston P-2 through connection A-2 causes downward movement of the treadle, whereas pressure applied to the lower side through connection B-2 causes upward movement of the treadle.

Figure 16:
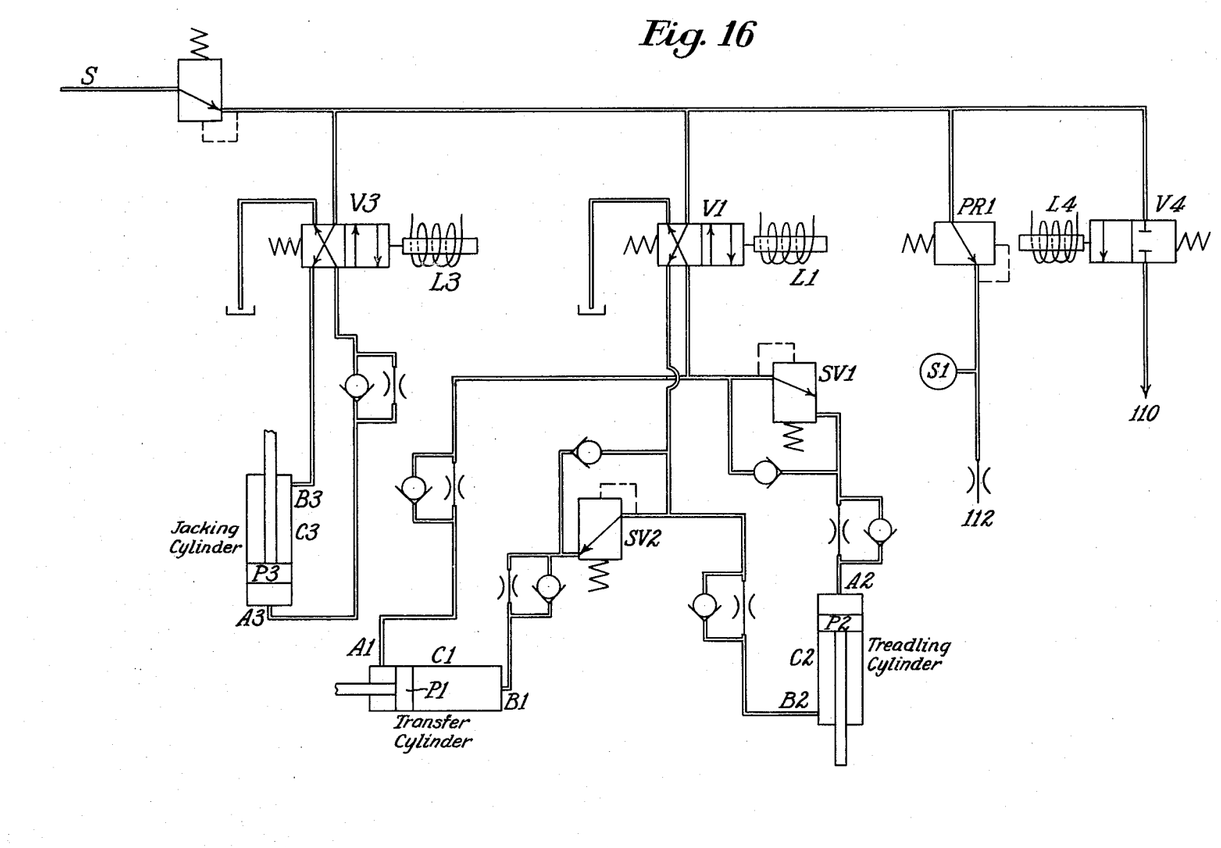
Fig. 16 is a schematic diagram of the pneumatic mechanism of the machine.
Figure 17:
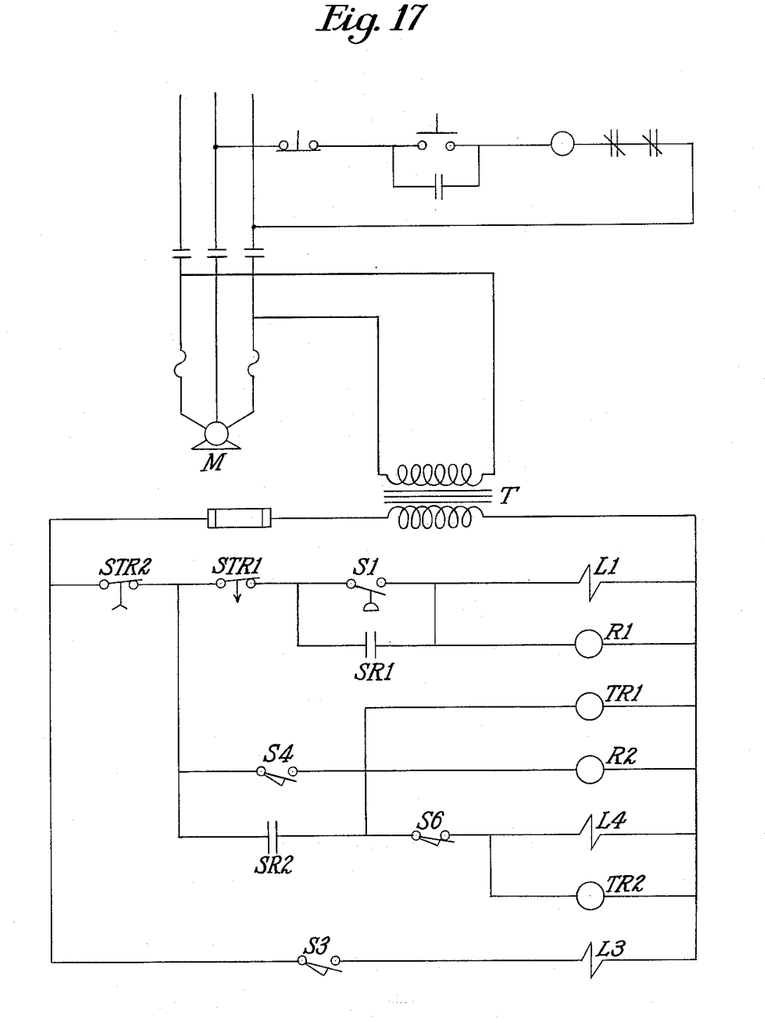
Fig. 17 is a schematic diagram of the electrical circuits of the machine.

The movements of the pistons and the associated machine parts are actuated and controlled by pneumatic and electrical circuits shown in Figs. 16 and 17, now to be described, as they operate during a machine cycle.

Assuming that the power to the machine is on, with the motor M of the fastener inserting mechanism running, the transformer T energized, and pressure in the air supply line S, the electrical circuit is in the condition shown in Fig. 17 and the hydraulic circuit is in the condition shown in Fig. 16.

Pressure regulator valve PR-1 is supplying air at a reduced pressure from the supply line S to the aperture 112, and to a normally open pressure switch S-1, so that a constant leakage of air from the aperture maintains the pressure at the pressure switch low enough that the switch is held open.

Reversing valve V-1, which is controlled by solenoid L-1, is held by the deenergized solenoid in the position shown schematically in Fig. 16, so that pressure is applied through sequence valve SV-2 to connection B-1 of the transfer cylinder C-1, maintaining the shoe positioning mechanism 80 in the "out" position, and also to connection B-2 of the treadling cylinder C-2, maintaining the treadle in the "up" position. Deenergized solenoid L-3 maintains reversing valve V-3 in the position shown, so that line pressure is supplied to connection B-3 of the jacking cylinder so as to tend to force the jacking piston P-3 downwardly.

Deenergized solenoid L-4 maintains valve V-4 in the position shown so that the air supply to the thimble hole 108 is shut off.

The machine cycle is started when the operator places a last 32, carrying a partially fabricated shoe, onto the thimble post 100 thereby obstructing the flow of air out of aperture 112. The resulting pressure build-up in the line from the regulator valve PR-1 closes pressure switch S-1, thereby energizing solenoid L-1 (see Fig. 17). To insure that the solenoid remains energized during the remainder of the cycle, the switch S-1 also energizes a relay R-1 which closes switch SR-1 in parallel with the pressure switch.

Thereafter pressure changes in the line downstream of the regulator, which might cause switch S-1 to open momentarily, will not cause deenergization of solenoid L-1, since the circuit remains completed through parallel switch SR-1.

The energization of solenoid L-1 causes reversing valve V-1 to shift from the position shown in Fig. 16 to the reverse position (to the left as shown schematically in Fig. 16), opening B-1 and B-2 to exhaust and admitting line pressure to A-1 of transfer cylinder C-1 and to sequence valve SV-1, which is normally closed unless full line pressure is applied to the upstream side thereof. Air admitted to connection A-1 forces piston P-1 toward the opposite end of the cylinder, thereby drawing the shoe positioning mechanism 80 to the "in" position, as in Fig. 2. While piston P-1 is moving, the air flow into the cylinder C-1 causes the pressure in the line from valve V-1 to remain somewhat below the supply line pressure, so that sequence valve SV-1 is held closed. When piston P-1 stops moving (when the positioning cam 116 contacts cam abutment 118) the pressure at the upstream side of sequence valve SV-1 builds up to full line pressure, opening valve SV-1 and admitting air to connection A-2 of treadling cylinder C-2, driving piston P-2 and the treadle downwardly.

The downward movement of the treadle and associated mechanisms accomplishes a number of different functions in a predetermined sequence to be described hereinafter in detail. These functions are, in sequence, admission of air to connection A-3 of jacking cylinder C-3, unlocking of the jack to allow the piston P-3 in cylinder C-3 to slide the shoe positioning mechanism upwardly to force the shoe against the awl plate, relocking of the jack so that back-up pressure may be imparted to the shoe positioning mechanism from the mechanism 40 through the locked jack, reversal of air pressure in the jacking cylinder C-3 and starting of the fastener inserting mechanism.

Figure 4:
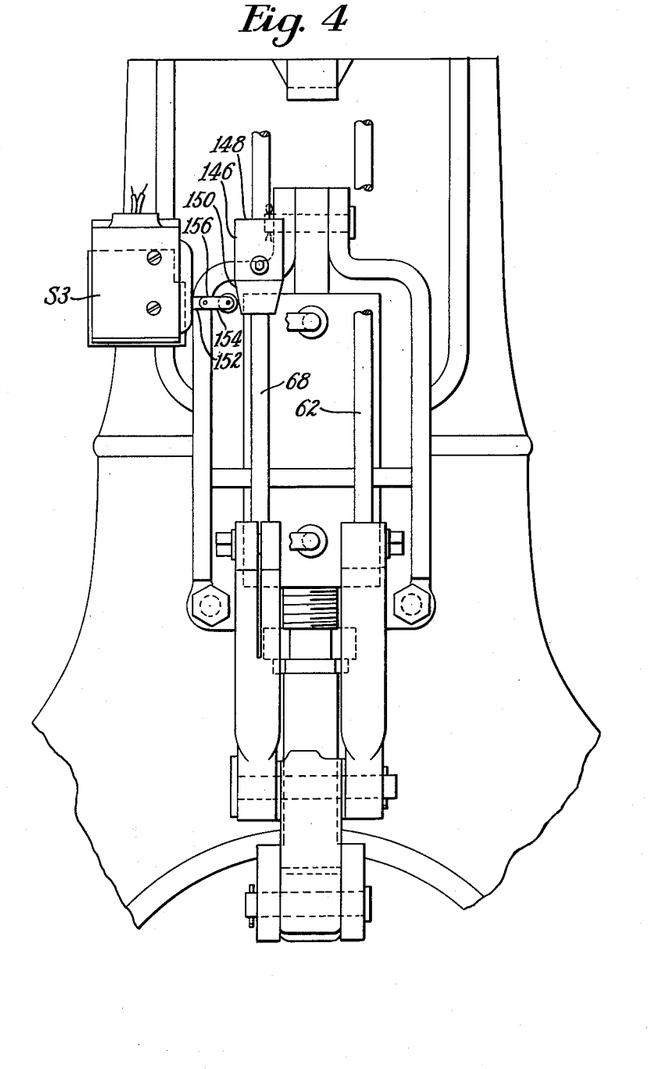
Fig. 4 is an enlarged view of the treadling mechanism as seen from the left side of Fig. 1, and is a continuation of the lower end of Fig. 3, with the treadle in the up or inoperative position.
Figure 5:
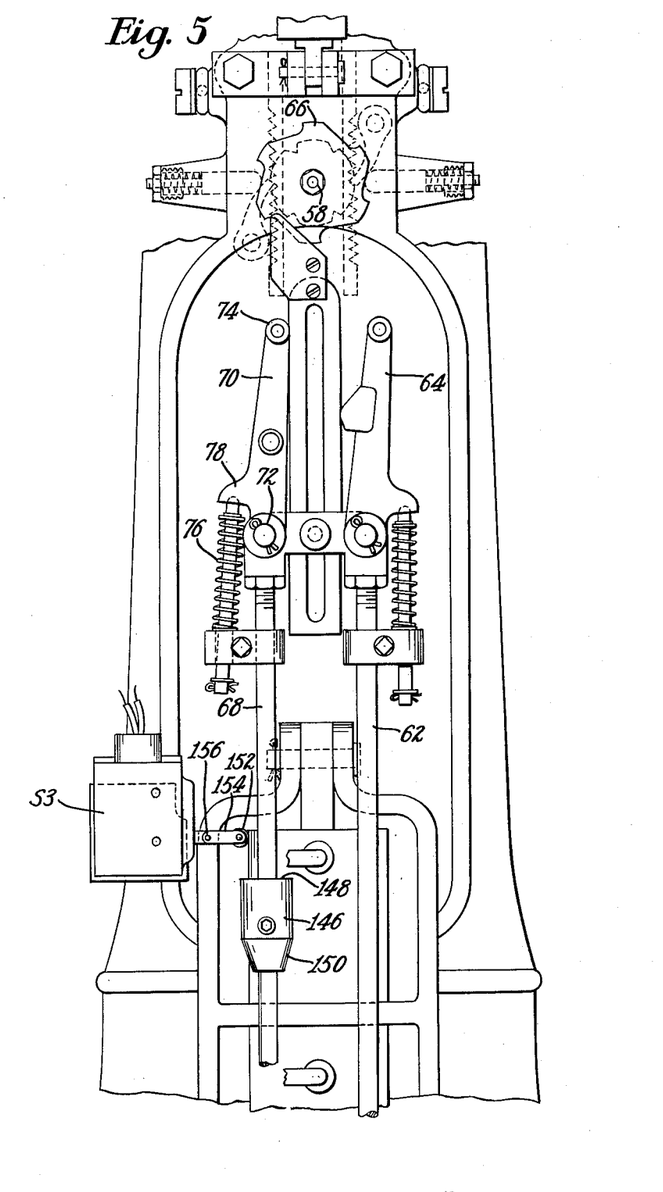
Fig. 5 is a front view of the jack, jack locking, and treadle mechanism, as seen from the left side of Fig. 2, with the treadle in the down or operative position, and the jack in the up and locked position.

Referring to Figs. 4 and 5, the treadle rod 68 is provided with a sleeve 146 having an abrupt upper end 148 and an inwardly inclined cam surface 150 on the lower end. Switch S-3 is mounted on the machine frame and is provided with a protruding plunger 152 which is positioned to be depressed inwardly by cam surface 150 on downward movement of the rod 68, thereby closing normally open switch S-3. The plunger 152 is provided with an end portion 154 which is hinged at 156 so as to be capable of pivoting upwardly.

On downward movement of the treadle and rod 68, after the cam surface 150 of the sleeve has depressed the plunger 152, switch S-3 is held closed by the sleeve until the abrupt shoulder 148 passes the end of the plunger, at which time the switch S-3 is again opened (see Fig. 5). It may be noted at this time that subsequent upward movement of the rod 68 does not depress the plunger, instead the abrupt shoulder 148 of the sleeve in engaging the end of the plunger causes the outer end portion 154 to pivot upwardly to permit the sleeve to pass without closing the switch S–3.

Closing of switch S–3 by downward movement of the treadle energizes solenoid L–3 which shifts reversing valve V–3 to admit air to connection A–3 of cylinder C–3, tending to drive jacking piston P–3 upwardly. At about the same time downward movement of the treadle rod 62 unlocks the jack mechanism 40 so that the piston P–3 can drive the bracket 78 and the shoe positioning mechanism upwardly until the shoe bears against the awl plate 20. While the piston P–3 is forcing the shoe positioning mechanism upwardly, the pressure in the transfer cylinder C–1 continues to urge the shoe positioning mechanism inwardly so that the positioning cam is continuously pulled against the cam abutment 118 to position the shoe in the manner described previously.

As the treadle 36 continues its downward motion, the link 64 passes beyond the cam plate 66 (see Fig. 3) so that the jack mechanism is again locked and, at the bottom of the stroke, the operation of the fastener inserting mechanism is started by the upward movement of rod 162, which effects the engagement of the clutch (not shown) of the fastener driving mechanism.

Fastener insertion now commences, with the last carrier, in cooperation with the rollers 144, guiding the shoe through the desired path, as described previously. While the fastener inserting operation proceeds, pressure is maintained at connection A–2 of the treadle cylinder to hold the treadle down and at connection A–1 of the transfer cylinder to hold the shoe support mechanism firmly against the cam abutment 118.

However, pressure in the jacking cylinder C–3 has been reversed, by reason of the fact that after sleeve 146 on rod 68 has passed beyond the plunger the switch S–3 opens, deenergizing solenoid L–3, permitting reversing valve V–3 to return to its original position. Hence, during the fastener inserting operation, the jacking cylinder C–2 has pressure at connection B–2 tending to pull the piston and the shoe positioning mechanism downwardly. However, any downward movement at this time is prevented by the fact that the jack mechanism 40 is locked.

The fastener inserting operation is terminated when the cam surface 128 strikes the projecting switch lever 130 on normally open switch S–4. Referring now to Fig. 17, it is seen that when switch S–4 is closed, relay R–2 is energized, which closes switch SR–2, in parallel with switch S–4, so that the circuits thereby energized are maintained in the energized condition. Hence, although switch S–4 is closed only momentarily by the cam surface 128, the circuits thereby energized are maintained in the energized condition after switch S–4 is opened.

Closing of switch S–4 and its parallel latching switch SR–2 also energizes timing relay TR–1 which controls the operation of switch STR–1, which is a normally closed switch, designed to open rapidly on energization of relay TR–1 and to close a predetermined time after deenergization of relay TR–1.

Hence, the energization of relay TR–1 immediately opens switch STR–1, breaking the circuit to solenoid L–1 (and its associated latching circuit) thereby permitting reversing valve V–1 to return to its original position, admitting air pressure to connection B–2 of cylinder C–2 and to sequence valve SV–2. Piston P–2 is thereby driven to the opposite end of the cylinder C–2, raising the treadle 36.

Upward movement of the treadle 36 first stops the fastener inserting mechanism and then, by upward movement of rod 68, unlocks the jack locking mechanism 38, in the manner previously described. Since pressure is already at connection B–3 of the jacking cylinder C–3, the instant the jack is unlocked, the piston P–3 is driven downwardly to pull the shoe support mechanism downwardly so that the shoe is drawn away from the awl plate.

As the treadle continues its upward movement, the jack locking mechanism is again locked and, as the piston P–2 reaches the end of its stroke, pressure at the upstream side of sequence valve SV–2 builds up to line pressure, permitting valve SV–2 to open to admit pressure to connection B–1 of cylinder C–1, driving piston P–1 to the opposite end of the cylinder, thereby moving the shoe support mechanism to the "out" position on bracket 79. As the shoe support mechanism reaches the "out" position, a projection 158 thereon depresses the plunger 160 of normally open switch S–6. The circuit to switch S–6 is still energized by reason of the latching circuit of switch SR–2, hence, closing of S–6 energizes solenoid L–4 and timing relay TR–2.

Solenoid L–4 operates valve V–4 admitting line pressure through connection 110 in the last support to the thimble aperture 100, so that the shoe and last are blown off of the thimble post to a suitable basket (not shown).

Timing relay TR–2 controls the operation of switch STR–2, which is normally closed, and designed to open, after a suitable time delay, on energization of relay TR–2, and to close immediately after TR–2 is deenergized.

Hence, on energization of relay TR–2 after a suitable time (about one second) switch STR–2 opens, which breaks the circuit to solenoid L–4, permitting it to return to its original position, shutting off the air blast.

Opening of switch STR–2 also resets the electrical circuits to the starting condition, by deenergizing relay TR–1, permitting switch STR–1 to close, deenergizing relay R–2 to open latching switch SR–2, and deenergizing timing relay TR–2, permitting switch STR–2 to again close. Hence, all circuits and pneumatic valves have returned to their original positions and the machine is ready for another cycle.

It will be noted that in the illustrated embodiment of the invention, the plane of movement of the shoe support mechanism is inclined at an angle of about 5° to a plane perpendicular to the direction of insertion of the fasteners, since it has been found desirable to insert the fasteners in such a manner that they are inclined inwardly from the edge of the heel. The outward inclination thereby imparted to the spindle post 100 also gives the shoe and last an outward component of motion when it is blown off at the end of the cycle.

Since certain obvious changes may be made in the illustrated device without departing from the scope of the invention, it is intended that all matter contained herein be interpreted in an illustrative and not in a limiting sense.

Having thus described my invention, what I claim as new and desire to secure by Letters Patent of the United States is:

1. A machine for inserting fasteners into the heel seat of a partially fabricated shoe disposed on a last, comprising a fastener inserting mechanism, a last carrier, means for moving said last carrier inwardly and upwardly to an operative position under said mechanism, and abutment means limiting said inward movement, said abutment means and said last carrier having portions cooperating to control the inward movement of said carrier according to the amount of upward movement thereof.

2. A machine for inserting fasteners into the heel seat of a partially fabricated shoe disposed on a last, comprising a fastener inserting mechanism, a last carrier, means for moving said last carrier inwardly and upwardly to an operative position in which the heel seat bears against the fastener inserting mechanism, and abutment means limiting said inward movement, said abutment means and said last carrier having cooperating cam means controlling the inward movement of said last carrier so that said inward movement is proportional to the heel height of the last disposed in said carrier.

3. A machine for inserting fasteners into the heel seat of a partially fabricated shoe disposed on a last, comprising a fastener inserting mechanism, a last carrier, means moving said last carrier inwardly and upwardly to an operating position so that the heel seat bears against the fastener inserting mechanism, and abutment means limiting said inward movement, said abutment means and said last carrier having cooperating cam means whereby inward movement of the last carrier requires a proportional amount of upward movement, the ratio of inward movement to upward movement being equal to the ratio of the radius of the fastener pattern at the back of the heel seat to the heel height of the last.

4. A machine for inserting fasteners into the heel seat of a partially fabricated shoe disposed on a last, comprising a fastener inserting mechanism, a last carrier, means for moving said last carrier inwardly and upwardly to an operative position so that the heel heat of the shoe carried thereby bears against the fastener inserting mechanism, and means responsive to said inward and upward movement for positioning said last carrier both laterally and longitudinally of the last carried thereby according to the size of said last.

5. A machine for inserting fasteners into the heel seat of a partially fabricated shoe disposed on a last, comprising a fastener inserting mechanism, a last carrier, means for moving said last carrier inwardly and upwardly to an operative position so that the heel seat of a shoe carried thereby bears against the fastener inserting mechanism, means responsive to inward movement of the last carrier to adjust the last carrier in a direction laterally of the shoe, and means responsive to upward movement of the last carrier to adjust the last carrier in a direction longitudinally of the shoe.

6. A machine for inserting fasteners into the heel seat of a partially fabricated shoe disposed on a last, comprising a fastener inserting mechanism, a last carrier mechanism movable inwardly to a position under said fastener inserting mechanism and then upwardly into an operative position, so that the heel seat of the shoe is disposed against the fastener inserting mechanism, said last carrier having a shoe positioning portion disposed thereon so as to be rotatable and movable laterally in relation to the fastener inserting mechanism, means maintaining said shoe positioning mechanism oriented so that the heel seat center line of the last carried thereon is generally perpendicular to the direction of inward movement of the last carrier mechanism, an abutment limiting the inward movement of the last carrier, said abutment and said last carrier having cooperating cam surfaces so that inward movement of said last carrier is proportional to the upward movement thereof, whereby the innermost position of the shoe and last in a direction transverse to the heel seat center is determined by the heel height of the last, and a second abutment engageable with the shoe positioning portion on upward movement thereof, and having means moving said shoe and last in a direction parallel to the heel center line to a position determined by the heel height of the last.

7. A machine for inserting fasteners into the heel seat of a partially fabricated shoe disposed on a last, comprising a fastener inserting mechanism, a last carrier movable inwardly to a position under said fastener inserting mechanism and upwardly so that the heel seat of the shoe carried thereby is disposed against the fastener inserting mechanism, means for moving said last carrier inwardly, means responsive to the completion of said inward movement to effect upward movement of the last carrier and to thereafter initiate the fastener inserting operation, and means responsive to completion of said fastener inserting operation to cause downward and outward movement of said last carrier.

8. A shoe positioning mechanism for controlling the movement imparted to a lasted shoe by a fastener inserting mechanism that indexes the shoe laterally, comprising a last support movable into an operative position under said mechanism, said support being rotatable in said position, and a guide plate disposed on said support, said guide plate being non-rotatable in relation to said support and movable laterally thereon, the outer periphery of said plate having a portion corresponding in shape to the desired fastener pattern, stationary guide means positioned for abutting the edge of said guide plate, and means maintaining said guide plate against the guide means as said plate is moved by the fastener inserting mechanism.

9. A shoe positioning mechanism for controlling the movement imparted to a lasted shoe by a fastener inserting mechanism that indexes the shoe laterally, comprising a last support movable into an operative position under said mechanism, and a guide plate disposed on the last support, said last support being rotatable in said operative position, said guide plate having a thimble post projecting upwardly therefrom to receive the last, the axis of said thimble post being normally offset laterally from the axis of rotation of the last support, said guide plate being movable laterally on said last support so that the thimble post axis can become alined with the axis of rotation of the last support.

10. A shoe positioning mechanism as set out in claim 9, in which said guide plate has two opposite sides joined by a semicircular portion and said thimble post is disposed at the center of curvature of the semicircular portion.

References Cited in the file of this patent

UNITED STATES PATENTS

| | | |
|---|---|---|
| 919,424 | Cuff | Apr. 27, 1909 |
| 1,733,200 | Ray | Oct. 29, 1929 |
| 2,877,460 | Lee | Mar. 17, 1959 |